(12) United States Patent
Ohtoshi

(10) Patent No.: US 11,856,169 B2
(45) Date of Patent: Dec. 26, 2023

(54) DISPLAY DEVICE, DOCUMENT READING DEVICE, AND IMAGE FORMING APPARATUS

(71) Applicant: SHARP KABUSHIKI KAISHA, Sakai (JP)

(72) Inventor: Takenori Ohtoshi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/857,891

(22) Filed: Jul. 5, 2022

(65) Prior Publication Data

US 2023/0055671 A1 Feb. 23, 2023

(30) Foreign Application Priority Data

Aug. 18, 2021 (JP) ................. 2021-133453

(51) Int. Cl.
 *H04N 1/028* (2006.01)
 *H04N 1/00* (2006.01)
 *F21V 8/00* (2006.01)

(52) U.S. Cl.
 CPC ....... *H04N 1/02835* (2013.01); *G02B 6/0025* (2013.01); *G02B 6/0046* (2013.01); *H04N 1/00538* (2013.01)

(58) Field of Classification Search
 CPC ......... G03G 15/60; G03G 2215/00185; G03G 15/04045; G03G 15/6576; G03G 21/20; G03G 2215/00662; G03G 2215/0158; H04N 1/0057; H04N 1/00015; H04N 1/00023; H04N 1/00031; H04N 1/00045; H04N 1/00055; H04N 1/00063; H04N 1/00068; H04N 1/00087; H04N 1/0009; H04N 1/1135; H04N 1/2346; H04N 1/506; H04N 2201/0094; H04N 2201/0471; H04N 2201/04722; H04N 2201/04729; H04N 2201/04732; H04N 1/00538; H04N 1/02835; B41J 2/473; B41J 2/525; G02B 6/0025; G02B 6/0046
 (Continued)

(56) References Cited

U.S. PATENT DOCUMENTS 7,532,800 B2 * 5/2009 Iimura ................ G02B 6/0048
 362/610
8,274,664 B2 * 9/2012 Tamura ............. H04N 1/00519
 358/401

(Continued)

FOREIGN PATENT DOCUMENTS

JP S61-140439 A 6/1986
JP 2013-205756 A 10/2013

*Primary Examiner* — Negussie Worku
(74) *Attorney, Agent, or Firm* — ScienBiziP, P.C.

(57) ABSTRACT

A display device includes a non-translucent cover, a light source provided inside the cover, and a translucent light display that is transmissive to light from the light source. The light display has a protrusion disposed in a through opening of the cover. The protrusion fitted into the through opening from the inside spans a first side surface and a second side surface of the cover, and protrudes outward from the outer surface of the cover to form a light guide. The light guide has a smaller thickness in a corner portion corresponding to a connection region between the first side surface and the second side surface than in other portions thereof.

9 Claims, 8 Drawing Sheets

(58) Field of Classification Search
USPC .......................................................... 358/400
See application file for complete search history.

(56) References Cited

U.S. PATENT DOCUMENTS

| | | | | |
|---|---|---|---|---|
| 9,377,178 | B2* | 6/2016 | Saccomanno | G02B 6/0025 |
| 10,893,159 | B2* | 1/2021 | Kuroda | H04N 1/0049 |
| 2009/0147324 | A1* | 6/2009 | Tamura | H04N 1/00519 |
| | | | | 358/498 |
| 2012/0206936 | A1* | 8/2012 | Okada | H04N 1/00551 |
| | | | | 362/602 |
| 2012/0287454 | A1* | 11/2012 | Arimura | H04N 1/00628 |
| | | | | 358/1.13 |
| 2013/0221599 | A1* | 8/2013 | Miyahara | B65H 7/20 |
| | | | | 271/9.06 |
| 2020/0128138 | A1* | 4/2020 | Kuroda | H04N 1/0049 |
| 2021/0021725 | A1* | 1/2021 | Kurimoto | H04N 1/00602 |
| 2022/0057638 | A1* | 2/2022 | Sato | G02B 27/0018 |
| 2022/0113666 | A1* | 4/2022 | Ohtoshi | G03G 15/60 |
| 2022/0236587 | A1* | 7/2022 | Yanai | G02B 30/56 |
| 2023/0038178 | A1* | 2/2023 | Ohtoshi | G03G 15/60 |

\* cited by examiner

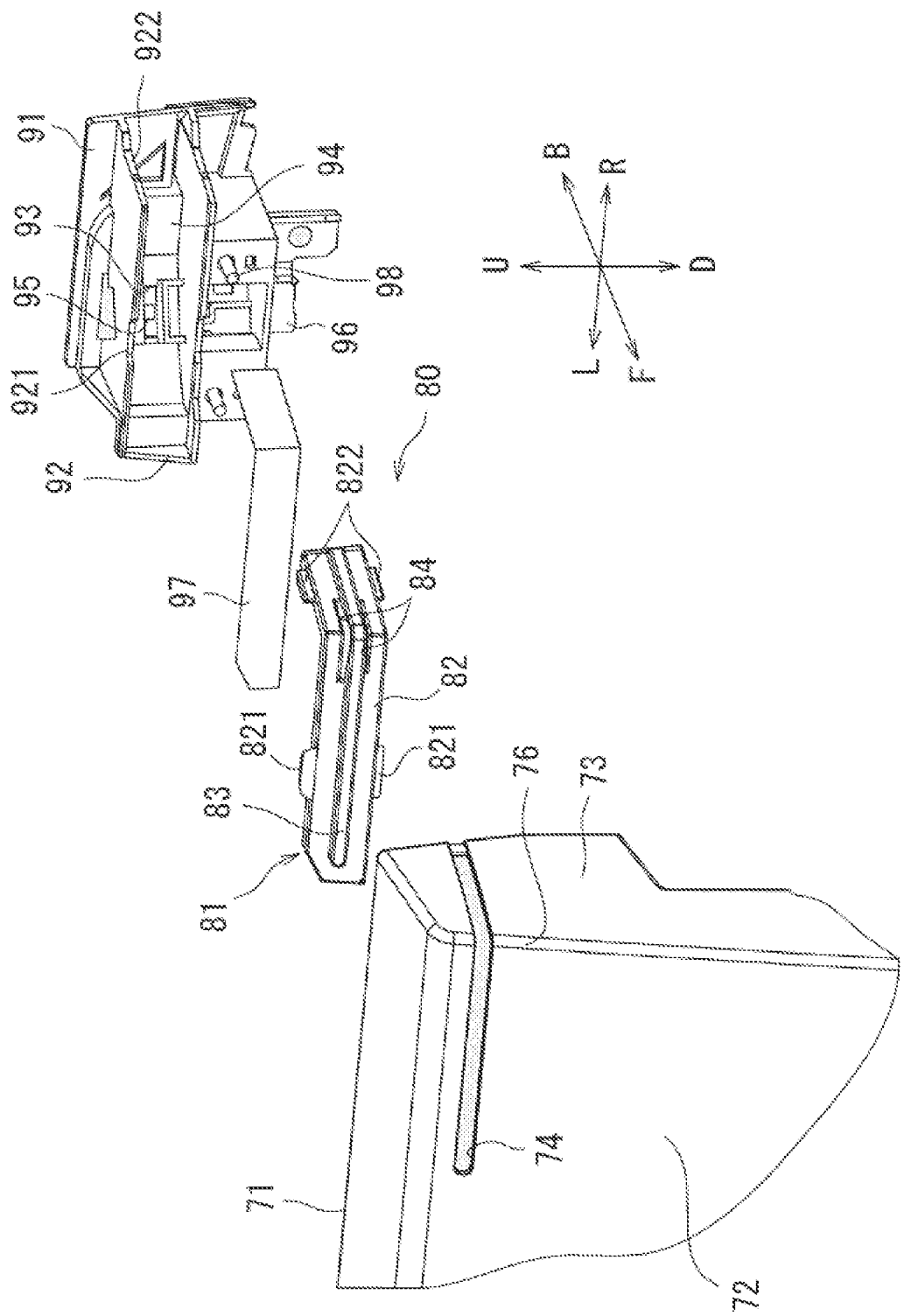

DISPLAY DEVICE, DOCUMENT READING DEVICE, AND IMAGE FORMING APPARATUS

BACKGROUND OF THE INVENTION

Field of the Invention

The present disclosure relates to a display device, and a document reading device and an image forming apparatus that include the display device.

Description of the Background Art

A widely known electrophotographic image forming apparatus includes a document reading device having an automatic document feeder (ADF) that feeds one or more document sheets one at a time in sequence. This type of document reading device tends to be located above an operation panel in the image forming apparatus. In the document reading device, a document loading receiver on which a document is loaded by an operator tends to be located further toward the rear than the operation panel when viewed from the operator. Because of the location, it is sometimes difficult for the operator to see a document loaded on the document loading receiver.

If the operator tilts the document reading device upward to open the document reading device without noticing a document set or left on the document loading receiver, for example, the document falls from the document loading receiver. In a case where the operator is seated in a wheelchair, for example, the document loading receiver is above the operator's eye level, making it even more difficult to tell whether or not a document is present. Therefore, there has been a demand for a display device capable of notifying the operator of the presence or absence of a document on the document loading receiver in an easily recognizable manner.

For example, in a widely known configuration of an image forming apparatus, a notification lamp provided on an operation panel lights up when a document is set on a document loading receiver with another document set on a glass document table.

However, the notification lamp described above is located on the operation panel and is distant from the document loading receiver. The operator can therefore miss the lighting-up of the notification lamp even if the notification lamp is on. Even if the operator notices the lighting-up of the notification lamp, it can be difficult for the operator to understand what information is intended to be communicated by the notification lamp.

The present disclosure has been made in view of the problems described above, and an object thereof is to provide a display device capable of effectively guiding an operator's gaze using a light guide that is easily visible to the operator and that can emit light uniformly, and to provide a document reading device and an image forming apparatus that include the display device.

SUMMARY OF THE INVENTION

In order to achieve the aforementioned object, the present disclosure is directed to a display device including: a non-translucent housing; a light source provided inside the housing; and a translucent light display that is transmissive to light from the light source, the housing having a through opening that penetrates inner and outer surfaces thereof, and adjacent first and second side surfaces respectively extending in directions intersecting each other, the through opening spanning the first side surface and the second side surface, the light display having a light guide fitted into the through opening and protruding outward from the outer surface of the housing, the light guide having a smaller thickness in a portion corresponding to a connection region between the adjacent first and second side surfaces than in other portions thereof.

Preferably, in the display device having the above-described configuration, the light guide includes a tapered portion having a thickness that progressively decreases toward the connection region.

Preferably, in the display device having the above-described configuration, the light display has a contact member that extends from the light guide and that makes contact with the inner surface of the housing, and the contact member and the light guide have a gap therebetween at a location corresponding to the connection region on the contact member.

Preferably, the display device having the above-described configuration further includes a holder that positions the light source and the light display, and that forms a space for guiding the light from the light source to the light display, and the contact member has a positioner for the positioning with respect to the holder.

Preferably, in the display device having the above-described configuration, the light guide and the light source have a light diffusion member therebetween.

A document reading device including the display device having the above-described configuration is also within the scope of the technical concept of the present disclosure. Specifically, the document reading device includes: the display device; a document loading receiver on which a plurality of document sheets are loadable; a document conveyance path through which each of the document sheets loaded on the document loading receiver is conveyed; and a paper feeder that feeds each of the document sheets loaded on the document loading receiver to the document conveyance path, wherein the first side surface is disposed along a document feeding direction, and the second side surface extends from one end of the first side surface and faces toward the document loading receiver, the one end of the first side surface being adjacent to the paper feeder, and the light guide is disposed in the connection region between the adjacent first and second side surfaces. An image forming apparatus including the document reading device having the above-described configuration is also within the scope of the technical concept of the present disclosure.

The present disclosure makes a light guide of a display device easily visible to an operator by enabling the light guide to emit light uniformly, making it possible to effectively guide the operator's gaze.

BRIEF DESCRIPTION OF THE DRAWINGS

FIG. 3A is an exploded perspective view illustrating an internal configuration of a display device according to the embodiment of the present disclosure as viewed from the front.

DESCRIPTION OF THE PREFERRED EMBODIMENTS

The following describes a display device 80, a document reading device 10, and an image forming apparatus 1 according to an embodiment of the present disclosure with reference to the accompanying drawings.

Image Forming Apparatus and Document Reading Device

Figure 1:
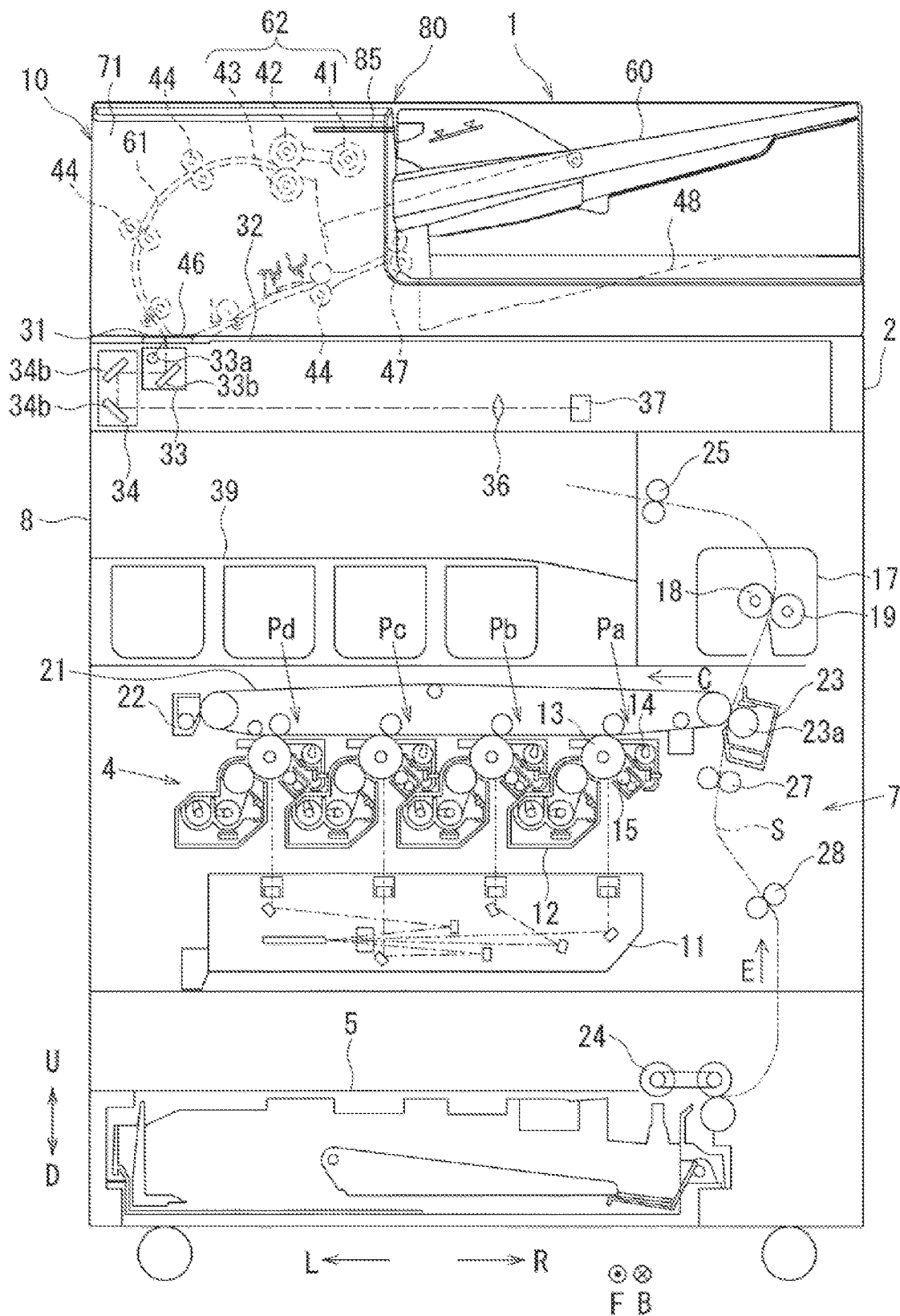
FIG. 1 is a schematic cross-sectional view of an image forming apparatus including a document reading device according to an embodiment of the present disclosure.

FIG. 1 is a schematic cross-sectional view of the image forming apparatus 1 including the document reading device 10 according to the embodiment of the present disclosure. In each of the drawings referred to in the following description, arrows F and B respectively indicate front (fore) and back (rear) in the image forming apparatus 1. Arrows R and L respectively indicate right and left in a front view of the image forming apparatus 1. Arrows U and D respectively indicate upper and lower in the image forming apparatus 1.

The image forming apparatus 1 is, for example, a multi-function peripheral having a copy function, a scanner function, a facsimile function, and a printer function. The image forming apparatus 1 transmits an image of a document read by the document reading device 10 to an external destination, or forms, on recording paper, a color or monochrome image of a document read by the document reading device 10 or a color or monochrome image received from an external source.

In the illustrated example, the image forming apparatus 1 includes, for example, an image reader 2, a process unit 4, a paper feed cassette 5, a paper conveyance device 7, and the document reading device 10. The process unit 4, the paper feed cassette 5, and the paper conveyance device 7 are accommodated within an image forming apparatus main body 8. The document reading device 10 is mounted above the image forming apparatus main body 8 in the upward direction U.

The document reading device 10 is supported to be openable and closable relative to the image reader 2 provided in the image forming apparatus main body 8. In the image reader 2, first and second scanners 33 and 34 move while maintaining a predetermined mutual speed relationship, a light source 33a of the first scanner 33 irradiates a document on a document loading glass 32 with light, mirrors 33b and 34b of the first and second scanners 33 and 34 guide light reflected from the document to an imaging lens 36, and the imaging lens 36 forms an image of the document on a charge coupled device (CCD) 37. The CCD 37 repeatedly reads the image of the document in a main scanning direction and outputs image data indicating the image of the document.

The document reading device 10 feeds a document loaded on a document loading receiver (document loading tray) 60 to a document conveyance path 61 one sheet at a time using a pickup roller 41, a paper feed roller 42, and a separation roller 43 that constitute a paper feeder 62. The separation roller 43 rotates in a direction opposite to a document feeding direction, so that all sheets other than the topmost sheet among the plurality of document sheets remain on the document loading receiver 60. The document fed to the document conveyance path 61 is conveyed by document conveyance rollers 44 provided along the document conveyance path 61 so as to pass between a document reading glass 31 and an opposing guide plate 46 in the document conveyance path 61, and then is discharged by a paper discharge roller 47 onto a paper discharge tray 48.

While the document is conveyed, the light source 33a of the first scanner 33 irradiates the document with light through the document reading glass 31. The light reflected from the document is reflected by the mirrors 33b and 34b of the first and second scanners 33 and 34, and is guided to the imaging lens 36. The imaging lens 36 forms an image of the document on the CCD 37, and the CCD 37 reads the image of the document. The image of the document read by the CCD 37 is outputted from the CCD 37 as an analog signal, and this analog signal is A/D converted to a digital signal. This digital signal (image data) is inputted to an optical scanning device 11 of the process unit 4 after being subjected to various image processing, and the image indicated by the image data is formed on recording paper in the process unit 4.

A cover 71 forming a housing of the document reading device 10 includes the display device 80. The display device 80 has a light guide 85 and is configured to communicate information related to the document loading receiver 60 through the light guide 85 lighting up. Details of this configuration will be described below.

In the process unit 4, in order to print a color image using black (K), cyan (C), magenta (M), and yellow (Y) colors or a monochrome image using a single color (for example, black) on recording paper, four developing units 12, four photoreceptor drums 13, four drum cleaners 14, and four charging rollers 15 are provided, constituting four image forming stations Pa, Pb, Pc, and Pd respectively corresponding to black, cyan, magenta, and yellow. The optical scanning device 11 is provided below the image forming stations Pa, Pb, Pc, and Pd.

In each of the image forming stations Pa, Pb, Pc, and Pd, the charging roller 15 uniformly charges a surface of the photoreceptor drum 13 to a predetermined potential after the drum cleaner 14 has removed and collected residual toner on the surface of the photoreceptor drum 13. Then, the optical scanning device 11 exposes the surface of the photoreceptor drum 13 to light to form an electrostatic latent image on the surface of the photoreceptor drum 13, and the developing unit 12 develops the electrostatic latent image on the surface of the photoreceptor drum 13 to form a toner image on the surface of the photoreceptor drum 13. Through the above, a toner image in the corresponding color is formed on the surface of each photoreceptor drum 13.

Subsequently, while an intermediate transfer belt 21 is in circular motion in a direction indicated by an arrow C, a belt cleaner 22 removes and collects residual toner from the intermediate transfer belt 21, and then the toner images in the respective colors are sequentially transferred from the surfaces of the respective photoreceptor drums 13 to the intermediate transfer belt 21. The toner images are thus superimposed on one another to form a color toner image on the intermediate transfer belt 21.

A nip area is formed between the intermediate transfer belt 21 and a transfer roller 23a of a secondary transfer device 23. While recording paper conveyed through a paper conveyance path S is nipped and further conveyed in the nip area, the color toner image on the surface of the intermediate transfer belt 21 is transferred onto the recording paper. Subsequently, heat and pressure are applied to the recording paper passing between a heating roller 18 and a fixing roller 19 of a fixing device 17 to fix the color toner image on the recording paper.

In the paper conveyance device 7, recording paper is pulled out of the paper feed cassette 5 by a pickup roller 24, conveyed through the paper conveyance path S, and discharged onto a paper discharge tray 39 via paper discharge rollers 25 after passing through the secondary transfer device 23 and the fixing device 17. Rollers such as registration rollers 27, conveyance rollers 28, and the paper discharge rollers 25 are disposed along the paper conveyance path S. The registration rollers 27 temporarily stop the recording paper, align the leading edge of the recording paper, and then start conveyance of the recording paper in time for the transfer of the color toner image in the nip area between the intermediate transfer belt 21 and the transfer roller 23a. The conveyance rollers 28 facilitate the conveyance of the recording paper.

Figure 2:
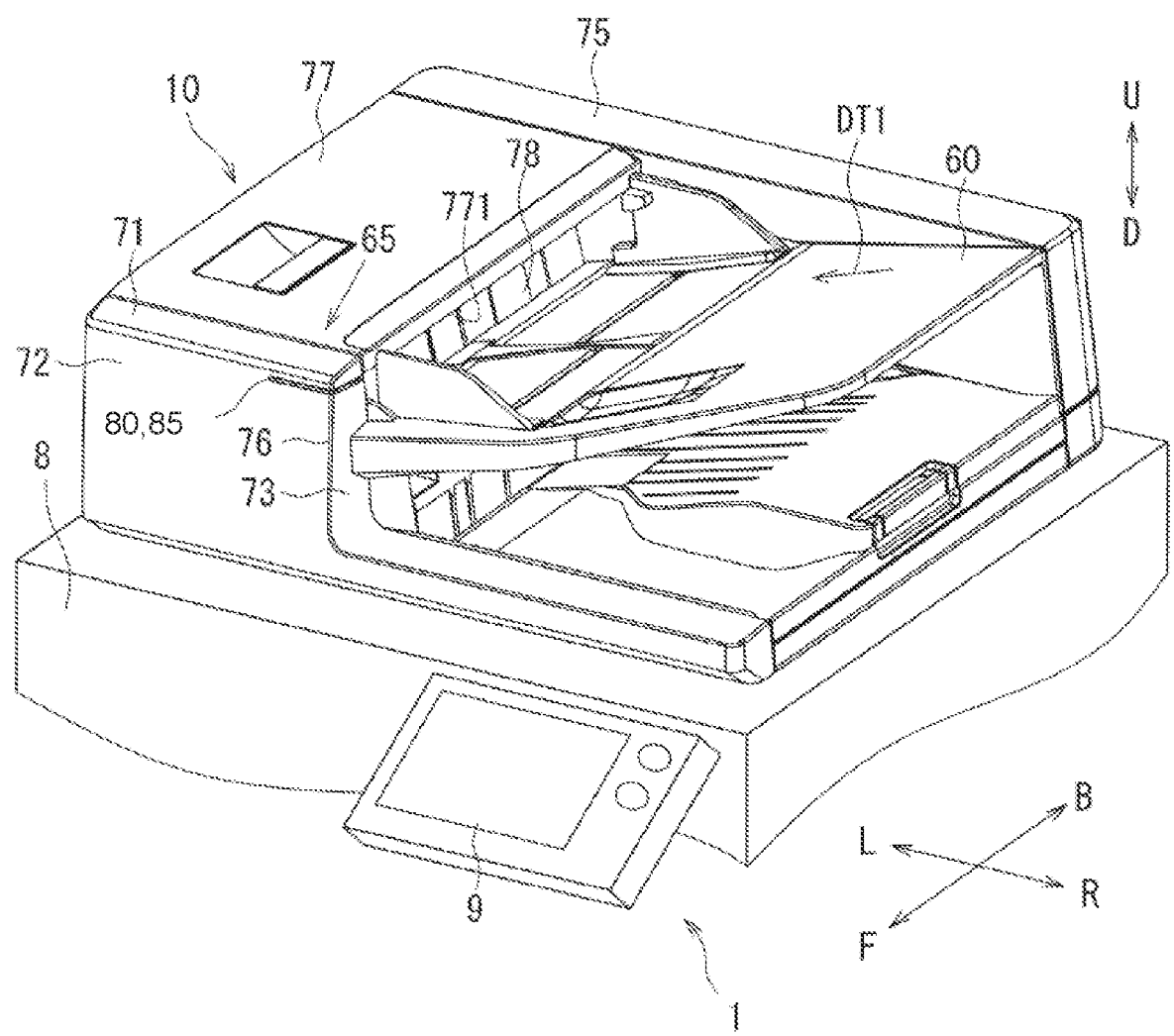
FIG. 2 is a perspective view of the document reading device according to the embodiment of the present disclosure.

FIG. 2 is a perspective view of the document reading device 10 according to the present embodiment. As illustrated in FIG. 2, the document reading device 10 includes the document loading receiver 60, the document conveyance path 61 (see FIG. 1), the paper feeder 62 (see FIG. 1), the cover 71, a back cover 75, a top cover 77, and the display device 80.

An operation panel 9 is provided in front F of the document reading device 10. The operation panel 9 is used for selective operation of, for example, the printer function, the scanner function, or the copy function of the image forming apparatus 1 and for selection of a color image or a monochrome image.

The document loading receiver 60 is located above the operation panel 9 in the upward direction U and is located further toward the back than the operation panel 9 when viewed from a location facing the operation panel 9. The document loading receiver 60 is configured so that a plurality of document sheets are loadable thereon. A document loaded on the document loading receiver 60 is conveyed through the document conveyance path 61 illustrated in FIG. 1. The document loaded on the document loading receiver 60 is pulled out by the pickup roller 41 of the paper feeder 62 and sent to the document conveyance path 61.

Note here that a document feeding direction DT1, which is the direction of the feeding of the document loaded on the document loading receiver 60 to the document conveyance path 61, is set to a direction from right R to left L in the example illustrated in FIG. 2. The document feeding direction DT1 and the front-back direction FB are perpendicular to each other.

The cover 71, the back cover 75, and the top cover 77 form the housing of the document reading device 10. The cover 71 is provided on the front F of the document reading device 10 to cover sides of the document conveyance path 61 and the paper feeder 62 in a direction perpendicular to the document feeding direction DT1. In the illustrated example, the cover 71 is provided to cover the front F of the paper feeder 62 and the document conveyance path 61 among all the sides thereof.

As illustrated in FIG. 2, the cover 71 has a first side surface 72 and a second side surface 73 respectively disposed in directions intersecting each other. The first side surface 72 is disposed along the document feeding direction DT1 and faces toward the front F. The second side surface 73 faces toward the right R. The second side surface 73 extends from one end of the first side surface 72, which is an end adjacent to the paper feeder 62, toward the document loading receiver 60 in a direction intersecting the document feeding direction DT1 and is located adjacent to the first side surface 72. The first side surface 72 and the second side surface 73 are continuous through a corner region (connection region) 76 connecting the first side surface 72 and the second side surface 73. Either or both of the first side surface 72 and the second side surface 73 may have a curved shape that bulges outward.

The back cover 75 is located on the back B of the document reading device 10. The back cover 75 is provided to cover the back B of the paper feeder 62 and the document conveyance path 61 among all the sides thereof.

The top cover 77 is located on the upper U of the document reading device 10. The top cover 77 covers the upper U of the paper feeder 62 and the document conveyance path 61, and thus forms a top surface of the document reading device 10. The top cover 77 and the document loading receiver 60 have a document passage 78 therebetween. An end 771 of the top cover 77 is an upper edge of the document passage 78, which is an opening through which the document fed by the paper feeder 62 passes.

The display device 80 communicates information related to the document loading receiver 60 to, for example, the operator through the light guide 85 lighting up. The light guide 85 lights up, for example, when a document is present (left) on the document loading receiver 60 to alert the operator. The light guide 85 of the display device 80 is provided at an upper location in the cover 71 near the corner region 76 where the first side surface 72 and the second side surface 73 connect to each other.

Note that the image forming apparatus 1 including the display device 80 is not limited to a multifunction peripheral such as described above, and may be applied to any apparatuses having an image forming function by an electrophotographic method, such as a printer, a copier, or a facsimile machine. Furthermore, the image forming apparatus 1 is not limited to being a color image forming apparatus, and may alternatively be a monochrome image forming apparatus.

Display Device

Figure 3B:
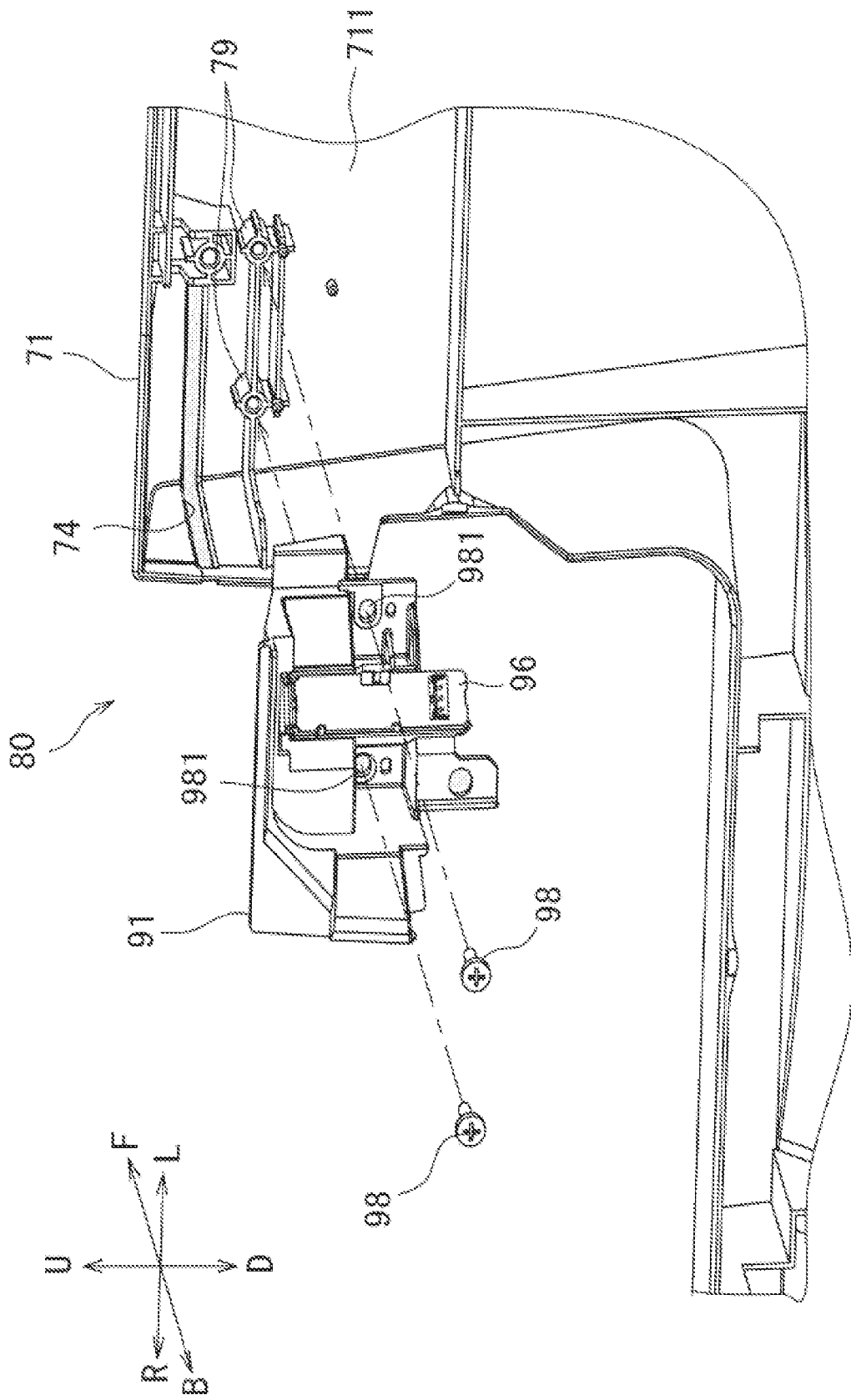
FIG. 3B is an exploded perspective view illustrating the internal configuration of the display device as viewed from the back.

The following describes the display device 80 according to the present embodiment in detail. FIGS. 3A and 3B illustrate a configuration of the display device 80 according to the embodiment of the present disclosure. FIG. 3A is an exploded perspective view illustrating an internal configuration as viewed from the front F. FIG. 3B is an exploded perspective view illustrating the internal configuration as viewed from the back B. Note that in the drawings, openings are shown in pale gray to make it easier to see the shape of each component.

The display device 80 has a light display 81, a light diffusion member 97, a holder 91, and a light source 95 inside the cover 71. As described above, the cover 71 has a shape including the first side surface 72, the second side surface 73, and the corner region 76. The cover 71 is provided with a through opening 74, which is an opening that penetrates both the front and back surfaces, near the corner region 76.

The through opening 74 is provided as a slit or line-shaped opening spanning the first side surface 72 and the second side surface 73. The through opening 74 extends in horizontal directions (left-right direction LR and front-back direction FB) both in the first side surface 72 and in the second side surface 73.

The light display 81 is disposed inside the cover 71, and is a member that allows the light from the light source 95 to pass therethrough to be emitted to the outside. The light display 81 is made of a translucent resin material and is, for example, a transparent, colorless or colored resin molding. This light display 81 includes a contact member 82 and a protrusion 83 that are integral with each other.

The holder 91 holding the light source 95 is provided in back B of the light display 81. The light diffusion member 97, which is translucent, is disposed between the light display 81 and the holder 91. The light diffusion member 97 is, for example, a sheet-shaped member and is attached to the light display 81 using adhesive tape or the like. The light diffusion member 97 diffuses the light from the light source 95 on a side thereof facing the light source 95 so that diffused light enters the light display 81. The presence of the light diffusion member 97 prevents the light display 81 from appearing bright only in an area corresponding to the light source 95 and prevents the light source 95 from being directly visible from the outside (front F and right R).

The holder 91 is a member that positions and holds the light display 81 and the light source 95 against an inner surface 711 of the cover 71, and that forms a space for guiding the light from the light source 95 to the light display 81. The holder 91 has a first opening 92, a second opening 93, and a wall 94. The wall 94 blocks the light from the light source 95 from being emitted from other areas than the first opening 92.

The first opening 92 is provided for receiving mounting of the light display 81 and emitting the light from the light source 95 to the outside through the light display 81. The second opening 93 is provided for receiving mounting of the light source 95. The second opening 93 is provided in a position opposed to the first opening 92. The second opening 93 is provided in the position opposed to the first opening 92 that receives mounting of the light display 81, and the light source 95 is mounted in the second opening 93. This configuration facilitates the mounting and replacement of the light source 95.

As illustrated in FIG. 3B, the holder 91 has screw holes 981, and the inner surface 711 of the cover 71 has attachments 79. As illustrated in FIG. 3A, the light display 81, the light diffusion member 97, the holder 91, and the light source 95 are arranged in the stated order inside the cover 71. As illustrated in FIG. 3B, these components are attached and fixed to the cover 71 in an integrated manner through the screw holes 981 and the attachments 79 using fasteners 98 such as screws. The holder 91 is fixed to the cover 71 with the protrusion 83 exposed from the through opening 74.

Figure 4A:
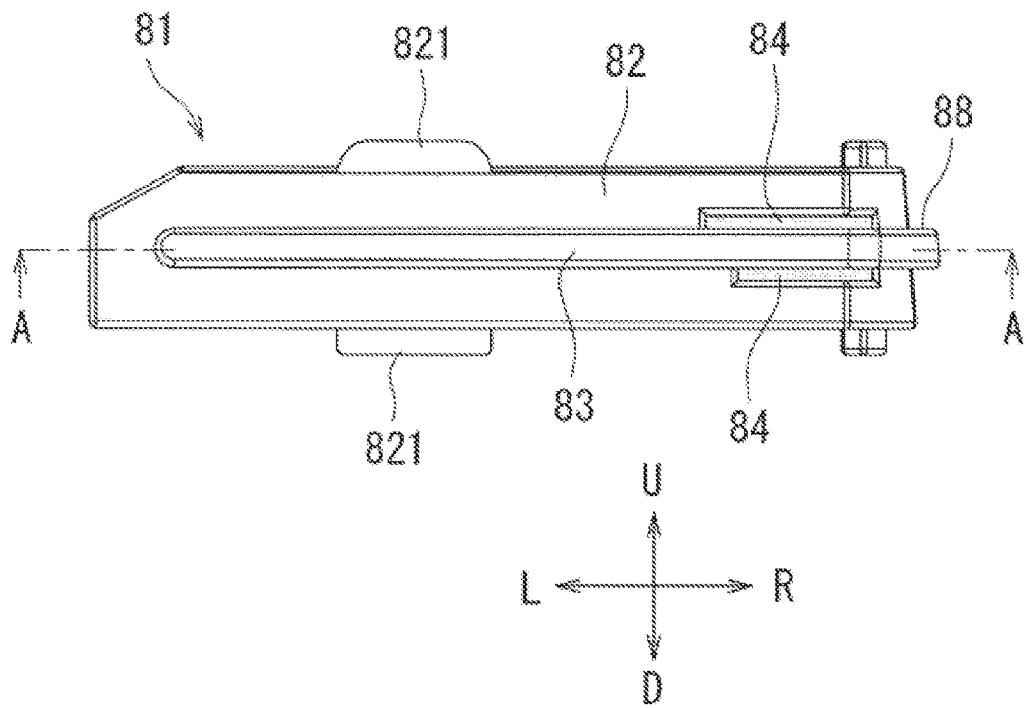
FIG. 4A is a front view of a light display provided in the display device.
Figure 4B:
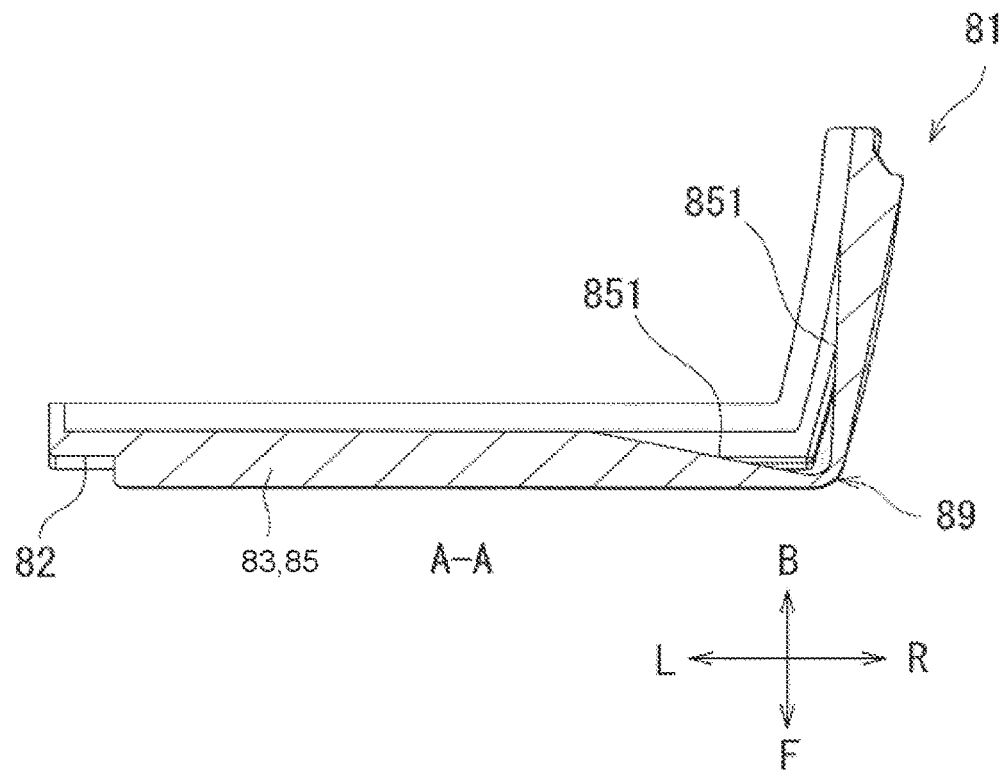
FIG. 4B is a cross-sectional view taken along line A-A in FIG. 4A.
Figure 4C:
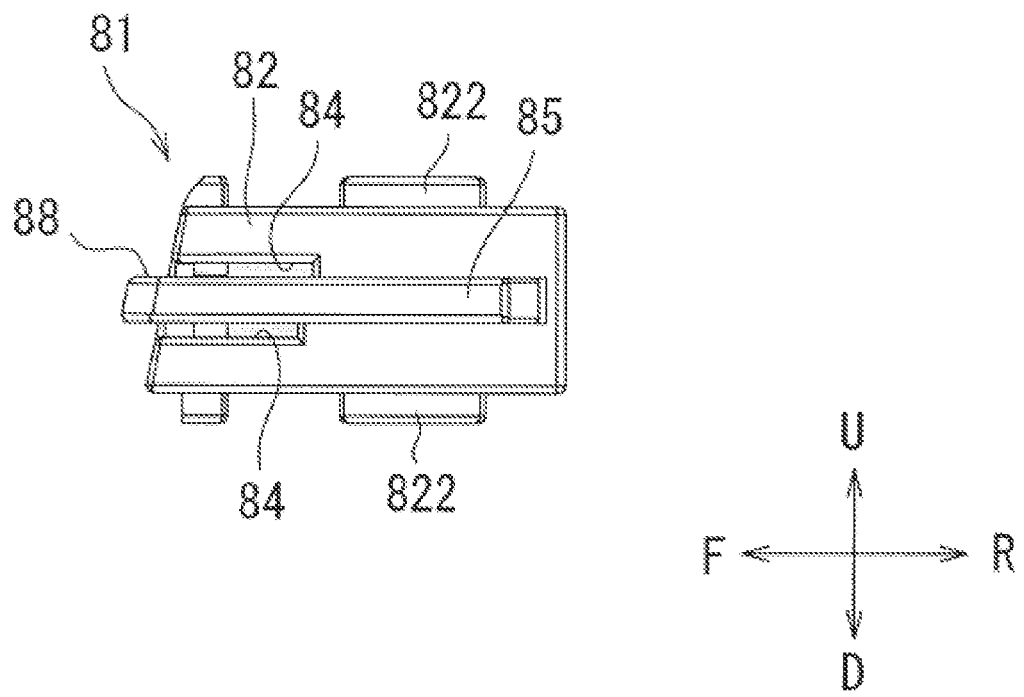
FIG. 4C is a right side view of the light display.

The following describes the light display 81 of the display device 80 in more detail. FIGS. 4A to 4C illustrate the light display 81. FIG. 4A is a front view of the light display 81. FIG. 4B is a cross-sectional view taken along line A-A in FIG. 4A. FIG. 4C is a right side view of the light display 81.

The light display 81 has the contact member 82 that makes contact with the inner surface 711 (see FIG. 3B) of the cover 71 and the elongate protrusion 83 protruding from the contact member 82. The light display 81 is, for example, substantially L-shaped as a whole in a plan view as illustrated in FIG. 4B.

The contact member 82 has a surface shape that follows the shape of the inner surface 711 of the cover 71 near the corner region 76 and is in the form of a substantially flat plate. In the illustrated example, as shown in FIGS. 4A and 4C, the contact member 82 has a descending slope shape that follows the shape of the cover 71.

The protrusion 83 is a rib-like member protruding from the contact member 82 toward the front F. The protrusion 83 is substantially L-shaped along the surface shape of the contact member 82 in a plan view. As shown on the right side of FIG. 4A and on the left side of FIG. 4C, a step 88 is formed by the protrusion 83 protruding from the contact member 82.

Preferably, a surface of the protrusion 83 has minute projections and recesses so that the light from the light source 95 is diffusely reflected and emitted from the entire light guide 85. In the present embodiment, the minute projections and recesses are, for example, grained to facilitate the diffuse reflection of the light.

As illustrated in FIG. 3A, the light display 81 is attached to the holder 91 holding the light source 95 and positioned relative to the holder 91. As illustrated in FIGS. 4A and 4C, the contact member 82 has positioning pieces 821 and 822 extending therefrom that serve as positioners for the positioning with respect to the holder 91. The positioning pieces 821 respectively extend in the upward direction U and the downward direction D from a front F-facing portion of the contact member 82. The positioning pieces 822 respectively extend in the upward direction U and the downward direction D from a right R-facing portion of the contact member 82.

As illustrated in FIG. 3A, the positioning pieces 821 are positioned by resting in positioning recesses 921 formed in an upper edge and a lower edge of the first opening 92 of the holder 91. The positioning pieces 822 are positioned by resting in positioning recesses 922 formed in the upper edge and the lower edge of the first opening 92 of the holder 91.

The protrusion 83 of the light display 81 is fitted into the through opening 74 formed in the cover 71 as a result of the light display 81 being disposed inside the cover 71. The step 88 is greater than the thickness of the cover 71. The protrusion 83 therefore protrudes outward from the outer surface of the cover 71 as a result of being fitted into the through opening 74 of the cover 71 and being positioned in the through opening 74. The protrusion 83 is a member that protrudes through the through opening 74 to be visible from the outside and forms the light guide 85 in the display device 80.

Figure 5:
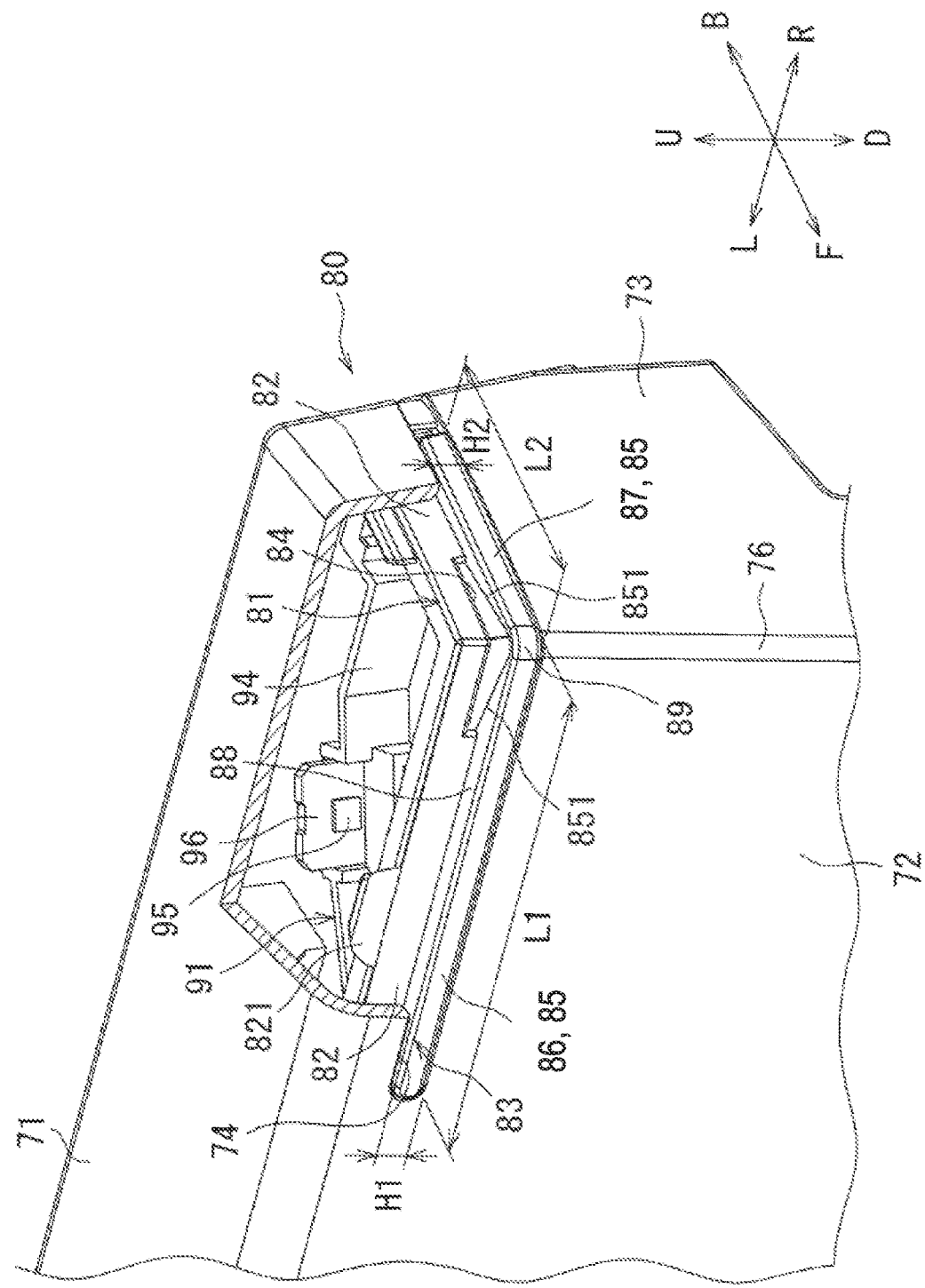
FIG. 5 is a perspective view of the display device with a portion of a cover cut away to better show the display device.
Figure 6:
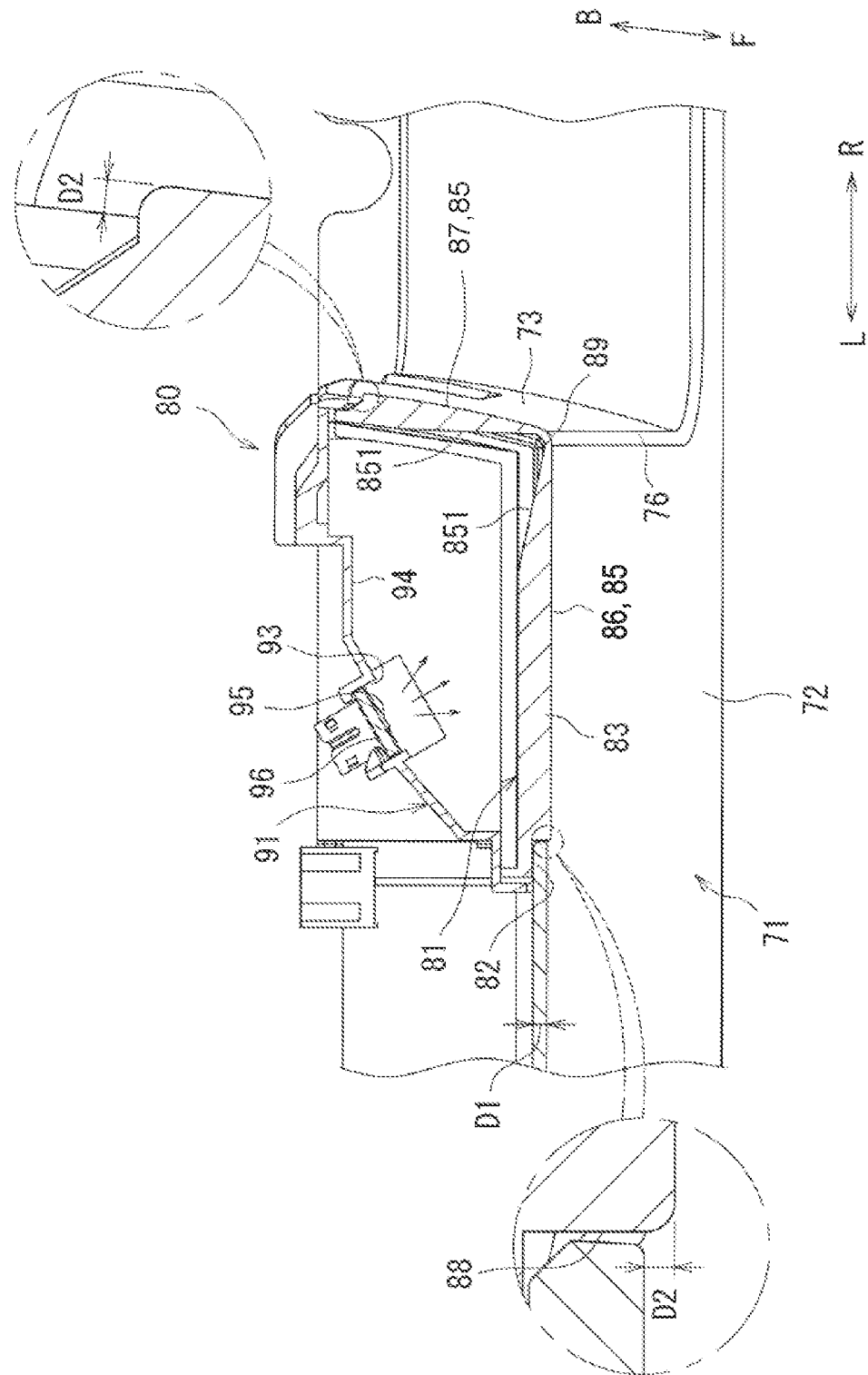
FIG. 6 is a cross-sectional view of a light guide provided in the display device sectioned in a horizontal direction.

FIG. 5 is a perspective view of the display device 80 with a portion of the cover 71 cut away to better show the display device 80. FIG. 6 is a cross-sectional view of the light guide 85 of the display device 80 sectioned in a horizontal direction and viewed from above.

As illustrated in FIGS. 5 and 6, the light display 81 is mounted in the first opening 92 of the holder 91, and the light source 95 is disposed in the second opening 93. The light source 95, which is an LED, is disposed on a substrate 96, and the substrate 96 is mounted in a position corresponding to the second opening 93 of the holder 91. The light emitted from the light source 95 goes into the space surrounded by the cover 71 and the holder 91, and passes through the light guide 85 of the light display 81. Note that the holder 91 in FIG. 5 is shown in cross-section to facilitate the illustration of the light source 95.

The light guide 85 protrudes outward from the cover 71 as a result of the protrusion 83 being exposed through the through opening 74 of the cover 71. The light guide 85 is a member that emits light by allowing the light from the light source 95 to pass therethrough, and thus communicates information related to the document loading receiver 60.

The display device 80 communicates, for example, that a document has been loaded or left on the document loading receiver 60 using light. In this case, a sensor, not shown, that detects whether a document is present on the document loading receiver 60 is provided, for example, on the top surface of the document loading receiver 60. Upon determining that a document is present on the document loading receiver 60 based on a detection signal from the sensor, a controller provided in the image forming apparatus main body 8 controls and directs the light source 95 of the display device 80 to turn on.

The light guide 85 includes a first light guide 86 and a second light guide 87. In the cover 71 having the light display 81 attached thereto, the first light guide 86 is located in the first side surface 72 of the cover 71, and the second light guide 87 is located in the second side surface 73 of the cover 71. In this arrangement, the second light guide 87 faces toward the document loading receiver 60. The first light guide 86 and the second light guide 87 each extend in a horizontal direction and are integral with the light display 81. Note that the first light guide 86 and the second light guide 87 are not limited to extending in the horizontal direction, and may each extend at an angle to the horizontal direction.

As illustrated in FIG. 5, the light guide 85 (i.e., protrusion 83) of the light display 81 has a corner portion 89 at a location corresponding to the corner region 76 of the cover 71. The corner portion 89 is where the first light guide 86 and the second light guide 87 connect to each other. Such a corner portion is typically thick in a diagonal direction. If the corner portion 89 has a greater thickness than other portions, the corner portion 89 is less transmissive to the light from the light source 95. In this case, the corner portion 89 can result in a decreased luminance and appear darker than originally intended during the light emission.

By contrast, in the case of the display device 80 according to the present embodiment, the thickness of the protrusion 83 of the light display 81 progressively decreases toward the corner portion 89. As illustrated in FIGS. 4B and 5, the protrusion 83 includes tapered portions 851 each having a thickness that progressively decreases from an inner surface toward an outer surface. The tapered portions 851 face toward the back B in the light display 81 and extend on opposite sides of the corner portion 89 in the horizontal direction. In the first light guide 86, the tapered portion 851 is provided so that the thickness of the protrusion 83 progressively decreases in the direction toward the right R with the decreasing distance from the corner portion 89. In the second light guide 87, the tapered portion 851 is provided so that the thickness of the protrusion 83 progressively decreases in the direction toward the front F with the decreasing distance from the corner portion 89.

In this configuration, as illustrated in FIGS. 4B and 6, the corner portion 89 has a smaller thickness than other portions owing to the tapered portions 851 formed to reach the corner portion 89. The smaller thickness of the corner portion 89 results in a smaller refractive index for the light from the light source 95. The smaller refractive index makes the light transmitted through the corner portion 89 less likely to attenuate. In particular, because of the tapered portions 851 having the progressively decreasing thickness, the attenuation prevention effect for the light passing through the light guide 85 increases with the decreasing distance from the corner portion 89. The light guide 85 can therefore emit light with a uniform luminance across the first light guide 86 and the second light guide 87 including the corner portion 89. The light guide 85 emitting light with a uniform luminance across the entire light guide 85 makes it possible to cause the operator's gaze to be directed to the light guide 85 more effectively.

The contact member 82 and the protrusion 83 have a gap 84 therebetween that spans a range of the tapered portions 851. As illustrated in FIGS. 4A and 4C, the gap 84 is formed in back B of the protrusion 83 and appears above and below the protrusion 83. As illustrated in FIG. 4B, the gap 84 has a shape surrounded by the tapered portions 851 extending in two directions and the external corner of the contact member 82 in a plan view. This configuration further reduces the thickness of the corner portion 89 and a portion therearound.

As illustrated in FIG. 5, a length L1 of the first light guide 86 in the horizontal direction is longer than a length H1 of the first light guide 86 in the up-down direction.

A length L2 of the second light guide 87 in the horizontal direction is longer than a length H2 of the second light guide 87 in the up-down direction. The lengths L1 and L2 of the first and second light guides 86 and 87 in the horizontal direction are respectively longer than the lengths H1 and H2 thereof in the up-down direction. According to this configuration, the second light guide 87 disposed in the second side surface 73 is elongate and faces toward the document loading receiver 60.

The second light guide 87, which is disposed in the second side surface 73 and faces toward the document loading receiver 60, and the first light guide 86, which is disposed in the first side surface 72, are adjacent to each other and are an extension of the end 771 of the top cover 77. This configuration makes it possible to continuously guide the operator's gaze to the document loading receiver 60 along the end 771 to which the light guide 85 extends. As a result, the operator can easily understand the fact that the information being communicated by the display device 80 is related to the document loading receiver 60 and the intent of the information.

Furthermore, by being an extension of the end 771 of the top cover 77, the light guide 85 can guide, for example, the operator's gaze from the top cover 77 to the document loading receiver 60 through the second light guide 87 emitting light to communicate the presence of a document.

As illustrated in FIG. 6, the step 88 formed by the protrusion 83 of the light display 81 has a greater thickness than a thickness D1 of the cover 71. The protrusion 83 therefore has a portion protruding outward through the through opening 74 of the cover 71. The portion protruding outward from the outer surface of the cover 71 is the light guide 85. In FIG. 6, the amount of protrusion of the step 88 relative to the outer surface of the cover 71 is denoted by D2. The protrusion 83 forming the step 88 as described above allows the light guide 85 to be exposed through the through opening 74, so that the light guide 85 emitting light is easily visible not only from the front F and from the right R but also from above U or from underneath D.

The above-described configuration allows the light guide 85 of the display device 80 to emit light uniformly, thereby effectively guiding the operator's gaze to the document loading receiver 60. Furthermore, the light guide 85 provided as described above makes it easier for the operator to understand, for example, that the information communicated by the display device 80 is related to the document loading receiver 60 and that a document is present on the document loading receiver 60.

Note that the information to be communicated by the display device 80 may be information other than the presence or absence of a document, as long as the information is related to the document loading receiver 60. Furthermore, the light may be, for example, blinked or changed in color for communicating information instead of being turned on or turned off. Furthermore, the display device 80 is not limited to being provided in the document reading device 10 as described above and may be provided at any location in the image forming apparatus 1. The display device 80 that communicates information through the light guide 85 emitting light is not limited to being provided in the image forming apparatus 1 and may be provided in any of various apparatuses.

The embodiments disclosed herein are exemplary in all aspects, and are not intended to be construed as a basis of limiting interpretation. The technical scope of the present disclosure is not intended to be understood based only on the embodiments described above, and is intended to be defined by the following claims. The technical scope of the present disclosure includes all variations that are equivalent in meaning and scope to the claims.

What is claimed is:

1. A display device comprising:
   a non-translucent housing surrounded by a plurality of surfaces;
   a light source provided inside the non-translucent housing; and
   a translucent light display that is transmissive to light from the light source,
   wherein the non-translucent housing has a through opening that penetrates inner and outer surfaces thereof, and first and second side surfaces that are adjacent to each other and that respectively extend in directions intersecting each other,
   the light source and the translucent light display are disposed inside the non-translucent housing surrounded by the plurality of surfaces including the first side surface and the second side surface,
   the through opening spans the first side surface and the second side surface,
   the translucent light display has a light guide fitted into the through opening and protruding outward from the outer surface of the non-translucent housing,
   the light guide is disposed in a corner region between the adjacent first and second side surfaces, and includes a first light guide located on the first side surface and a second light guide located on the second side surface, and
   the light guide has a smaller thickness in a corner portion, where the first light guide and the second light guide that are disposed in the corner region connect to each other, than in other portions thereof.

2. The display device according to claim 1, wherein
   the light guide further includes a tapered portion having a thickness that progressively decreases toward the corner portion.

3. The display device according to claim 1, wherein
   the translucent light display further has a contact member that extends from the light guide and that makes contact with the inner surface of the non-translucent housing, and
   the contact member and the light guide have a gap therebetween at a location corresponding to a corner region on the contact member.

4. The display device according to claim 3, further comprising:
   a holder that positions the light source and the translucent light display, and that forms a space for guiding the light from the light source to the translucent light display, wherein
   the contact member has a positioner for the positioning with respect to the holder.

5. The display device according to claim 1, further comprising:
   a light diffusion member positioned between the light guide and the light source.

6. A document reading device comprising the display device according to claim 1.

7. An image forming apparatus comprising the document reading device according to claim 6.

8. The document reading device according to claim 6, further comprising:
   a document loading receiver on which a plurality of document sheets is loadable;
   a document conveyance path through which each of the plurality of document sheets loaded on the document loading receiver is conveyed; and
   a paper feeder that feeds each of the plurality of document sheets loaded on the document loading receiver to the document conveyance path, wherein
   the first side surface is disposed along a document feeding direction, and the second side surface extends from one end of the first side surface and faces toward the document loading receiver, the one end of the first side surface is adjacent to the paper feeder.

9. An image forming apparatus comprising the document reading device according to claim 8.

* * * * *